United States Patent [19]
Daitoku

[11] 4,268,154
[45] May 19, 1981

[54] SELF-TIMER DEVICE FOR A CAMERA

[75] Inventor: Koichi Daitoku, Tokyo, Japan

[73] Assignee: Nippon Kogaku K.K., Tokyo, Japan

[21] Appl. No.: 117,806

[22] Filed: Feb. 1, 1980

[30] Foreign Application Priority Data

Mar. 16, 1979 [JP] Japan .............................. 54-32976[U]

[51] Int. Cl.³ .............................................. G03B 9/64
[52] U.S. Cl. ..................................................... 354/238
[58] Field of Search ........................ 354/237, 238, 239

[56] References Cited

U.S. PATENT DOCUMENTS

| | | | |
|---|---|---|---|
| 3,640,201 | 2/1972 | Kimura | 354/238 X |
| 3,641,902 | 2/1972 | Kikuchi et al. | 354/238 X |
| 3,812,512 | 5/1974 | Shimizu et al. | 354/238 |
| 3,955,209 | 5/1976 | Akiyama | 354/238 X |

FOREIGN PATENT DOCUMENTS 53-93130 4/1978 Japan .................................. 354/238

*Primary Examiner*—Donald A. Griffin
*Attorney, Agent, or Firm*—Fitzpatrick, Cella, Harper & Scinto

[57] ABSTRACT

In a self-timer device for a camera having a self-timer circuit including manually operated first switch means and adapted to start time count upon operation of the first switch means and to release a shutter when a predetermined time has elapsed, and a set member movable by manual operation between a first position for rendering the circuit capable of counting time and a second position for rendering the circuit incapable of counting time, there is provided means for moving the set member lying in said first position to said second position in response to film advance operation.

5 Claims, 3 Drawing Figures

SELF-TIMER DEVICE FOR A CAMERA

BACKGROUND OF THE INVENTION

1. Field of the Invention

This invention relates to a self-timer device for a camera.

2. Description of the Prior Art

A timer device is disclosed in Japanese Laid-open Patent Application No. 93130/1978. In this device, a set member for rendering a self-timer circuit capable of counting time is movable between an operable position in which the self-timer is capable of counting time and an inoperable position in which the self-timer is incapable of counting time. The set member is designed so that it is held in the operable position during the time counting of the self-timer and is brought to the inoperable position with the operation of the shutter release system after termination of its time counting function. This device obviates the possibility of the photographer neglecting to return the set member from the operable position to the inoperable position after self-timer photography and thereby prevents self-timer photography from taking place against his will during the next photographic operation.

However, by operatively associating the set member with the shutter release system, the transmission system from the shutter release button to the shutter driving system must perform the work of moving the set member. Accordingly, if, for example, the set member is operatively associated with the release button, a greater force is required to depress the release button than if the set member was not associated with it and also, where the release button is an electromagnetic release device, the attraction of the magnet must be increased and this causes an undesirable increase in the bulk of the device.

In order that the set member may be moved by the shutter driving system of the shutter release transmission system, it is necessary to cause a force for moving the set member to be additionally accumulated in a shutter driving spring, and the force accumulated in the shutter driving spring must be adjusted to a predetermined magnitude in order that the shutter may be moved at a stable speed. However, adding the force for moving the set member to the accumulated force makes it difficult to achieve such adjustment. Also, if the set member is moved by this accumulated force during the release of the accumulated shutter driving spring, namely, during the movement of the shutter, the movement of the shutter will become irregular thus adversely affecting the film exposure.

SUMMARY OF THE INVENTION

I have conceived and contribute by the present invention a self-timer device whereby I am able to assure that even if the photographer neglects to return the set member from the self-timer circuit operable position to the inoperable position after self-timer photography, self-timer photography will not again take place against his will during the next photographic operation. Additional advantages of my invention reside in the fact that the release button does not require any greater force for its operation and that the movement of the shutter is not adversely affected.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
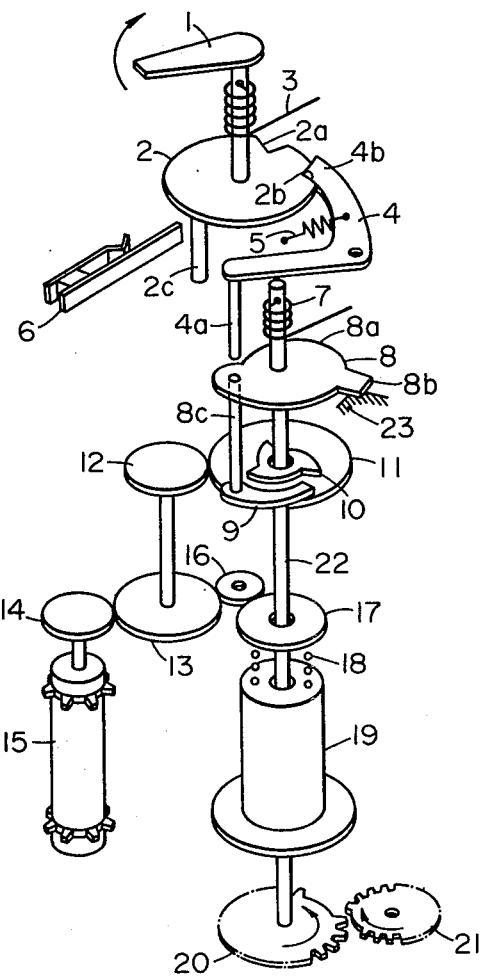
FIG. 1 is a perspective view showing an embodiment of the present invention.

Referring to FIG. 1, the components of the present embodiment are shown in a condition in which a self-timer circuit is operable and film advance operation (this operation also includes the charging operation of a shutter driving spring) has been completed.

When a set lever 1, which is the aforementioned set member, is manually rotated in clockwise direction from the position illustrated in FIG. 1, a self-set cam 2 is also rotated clockwise therewith. By this rotation, a return spring 3 accumulates energy for release in a counter-clockwise direction. On the other hand, the pawl portion 4b of a hold lever 4, biased counter-clockwise by a spring 5, is caused to shift its engagement from a recess 2b to a recess 2a by the rotation of the lever 1. Even if the hand of the photographer is released from the lever 1 after the pawl portion 4b has engaged the recess 2a, the set cam 2 is not returned to its original position due to the engagement force between the pawl portion 4b and the recess 2a. The position of the lever 1 when the recess 2b of the cam 2 is in engagement with the pawl portion 4b will hereinafter be referred to as the self-timer circuit inoperable position, and the position of the lever 1 when the recess 2a is in engagement with the pawl portion 4b will hereinafter be referred to as the self-timer circuit operable position.

Figure 2:
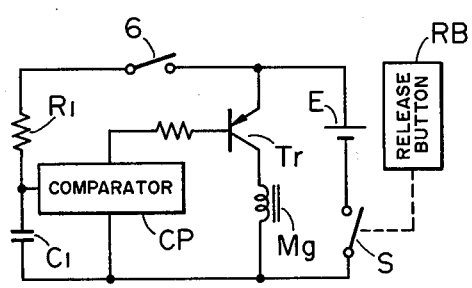
FIG. 2 is a circuit diagram showing an example of the self-timer circuit.

Immediately before the clockwise rotation of the cam 2 is terminated, a switch 6 is closed by a pin 2c studded in the cam 2. Upon closing of this switch 6, the self-timer circuit shown in FIG. 2 becomes operable. When a release button RB is depressed, a switch S operatively associated therewith is closed and the self-timer circuit starts to operate. In FIG. 2, when switches 6 and S are closed, a time constant circuit comprising a resistor $R_1$ and a capacitor $C_1$ starts to count time and, when a predetermined time has elapsed and the charging voltage of the capacitor $C_1$ has reached a predetermined level, a comparator circuit CP produces an output to turn on a transistor Tr. A magnet Mg is energized by the turn-on of the transistor Tr to release the shutter. After this shutter release, the switch S is opened. This self-timer circuit is of the analog type, but may of course be of the digital type.

Subsequently, when a drive gear 21 (FIG. 1) is rotated clockwise by the film advance operation after the shutter release has taken place, a gear 20 meshing with the drive gear 21, a shaft 22 and a disc 8 are rotated counter-clockwise in unison while a spring 7 accumulates energy. By the rotation of this disc 8, a ratchet pawl 9 provided on the disc 8 through a transmission pin 8c meshes with a ratchet gear 10 integral with a film advance gear 11, thereby to rotate the gear 11 in a counter-clockwise direction. This rotation of the gear 11 is transmitted to a sprocket 15 through gears 12–14 and also to a film spool 19 through gears 12, 13, 16, 17 and a friction spring 18 thus to effect film advance. Of course, the charging of the shutter driving spring is effected by a well-known mechanism at the same time.

In the course of the counter-clockwise rotation of the disc 8 resulting from the film advance operation, a pin 4a is driven outwardly by the cam portion 8a of the disc 8, so that the pawl portion 4b of the hold lever 4 is disengaged from the recess 2a of the set cam 2. Accordingly, by the restitutional force of the spring 3, the lever 1 and the cam 2 are rotated counter-clockwise and reset to the inoperable position. Incidentally, the cam portion 8a should desirably be shaped so as not to vary the film advance torque greatly.

The mesh-engagement between the gears 20 and 21 is released by respective cut-away portions of these gears when the sprocket 15 has completed a predetermined amount of rotation, and by the restitutional force of the spring 7, the disc 8, ratchet pawl 9, gear 20 and shaft 22 are rotated clockwise until the projection 8b of the disc 8 bears against a stop 23 to stop their rotation. This is the condition shown in FIG. 1.

Figure 3:
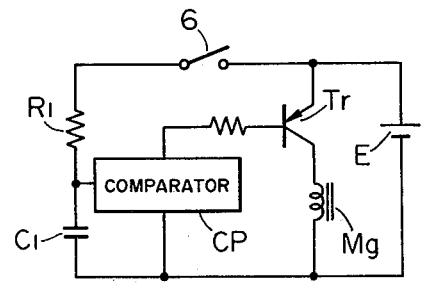
FIG. 3 is a circuit diagram showing another example of the self-timer circuit.

The present invention may also be designed so that the time counting of the self-timer circuit is started by the setting of the set member to the operable position, as shown in FIG. 3.

I believe that the construction and operation of my novel self-timer device for a camera will now be understood and that the several advantages thereof will be fully appreciated by those persons skilled in the art.

I claim:

1. A self-timer device for a camera having a self-timer circuit including manually operated first switch means and adapted to start a time count upon operation of said first switch means and to release a shutter when a predetermined time has elapsed, and a set member movable by manual operation between a first position for rendering said circuit capable of counting time and a second position for rendering said circuit incapable of counting time, the improvement comprising:

reset means for moving said set member from said first position to said second position in response to film advance operation.

2. A self-timer device according to claim 1, wherein said first switch means is operated in response to depression of the shutter release button of the camera, said set member includes second switch means connected in series with said first switch means and operated in response to the movement of said set member from said first position to said second position, and said self-timer circuit starts to count time when said set member has been moved to said second position and said shutter release button has been depressed.

3. A self-timer device according to claim 1, wherein said first switch means is operated in response to the movement of said set member from said first position to said second position to start the time counting of said self-timer circuit.

4. A self-timer device according to claim 1, wherein said reset means include means adapted to accumulate energy during movement of said set member from said second to said first positions whereby to reset said set member to said second position in response to film advance operation.

5. A self-timer device according to claim 4, wherein said reset means further include hold means operable releasably to retain said set member in either of said first and second positions and means for moving said hold means to permit reset of said set member to said second position in response to film advance operation.

* * * * *